(12) United States Patent
Cherubini et al.

(10) Patent No.: US 7,760,821 B2
(45) Date of Patent: Jul. 20, 2010

(54) OVERSAMPLED CHANNEL RESPONSE IDENTIFICATION

(75) Inventors: Giovanni Cherubini, Rueschlikon (CH); Evangelos S. Eleftheriou, Zurich (CH); Robert Allen Hutchins, Tucson, AZ (US); Glen Alan Jaquette, Tucson, AZ (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 11/558,949

(22) Filed: Nov. 13, 2006

(65) Prior Publication Data

US 2008/0137722 A1     Jun. 12, 2008

(51) Int. Cl.
*H04L 27/06* (2006.01)
(52) U.S. Cl. ..................................................... 375/340
(58) Field of Classification Search ............. 375/340, 375/343
See application file for complete search history.

(56) References Cited

U.S. PATENT DOCUMENTS

| | | | |
|---|---|---|---|
| 7,145,972 B2* | 12/2006 | Kumar et al. ............. | 375/349 |
| 2003/0215029 A1* | 11/2003 | Limberg .................. | 375/321 |
| 2005/0123034 A1* | 6/2005 | Lee et al. ................ | 375/233 |
| 2007/0211786 A1* | 9/2007 | Shattil .................... | 375/141 |
| 2007/0217546 A1* | 9/2007 | Sandell et al. ........... | 375/299 |

* cited by examiner

*Primary Examiner*—Don N Vo
(74) *Attorney, Agent, or Firm*—Michael J. Buchenhorner; Stephen C. Kaufman

(57) ABSTRACT

Methods, apparatus and computer programs are provided for multiplication-free identification of the impulse response of an oversampled data channel. An input comprising a pseudo-random binary sequence of L symbols is supplied to the channel at a symbol rate of 1/T. A channel output is produced by sampling a channel output signal corresponding to the input with a sampling interval $T_S=(q/p)T$, where q and p are relative prime integers with $q<p$, and q and L are relative prime integers. p polyphase sequences are produced from the channel output by selecting, for each polyphase sequence, every $p^{th}$ sample of the channel output, with a phase shift of one sample between successive polyphase sequences). A decimated binary sequence is produced by selecting every $q^{th}$ symbol of the channel input. Each polyphase sequence is correlated with the decimated binary sequence, the two possible binary values being of equal magnitude and opposite sign for the correlation. The correlation results are accumulated to produce a correlated output sequence for that polyphase sequence. The samples of the correlated output sequences are then interleaved in phase order of the corresponding polyphase sequences to produce the impulse response of the channel.

22 Claims, 7 Drawing Sheets

Fig. 2 channel input
a = a(mT) m = 0, 1, ...251
4 periods of length 63 PRBS a0 to a62:

| a0 a1 ... a3 a4 a5 ... a62 | a0 a1 a2 ... a5 ... a61 a62 | a0 a1 a2 ... a6 ... a61 a62 | a0 ... a3 a4 ... a59 ... a62 |

Fig. 3 decimated input sequence
b = a(k4T) k = 0, 1, ...62
length 63 PRBS:

| a0 a4 a8 a12 a16 ... a60 | a1 a5 a9 a13 ... a57 a61 | a2 a6 a10 a14 ... a58 a62 | a3 a7 a11 a15 ... a55 a59 | sampled output signal
y = y(n*4T/5) n = 0, 1, ... 314
4 * 63 T time interval:

| y(0) y(4T/5) ... y(77*4T/5) | y(78*4T/5) ... y(156*4T/5) | y(157*4T/5) ... y(235*4T/5) | y(236*4T/5) ... y(314*4T/5) |

Fig. 4 average channel output
z = z(n*4T/5) n = 0, 1, ... 314
average of M signals y:

| z(0) z(4T/5) ... z(77*4T/5) | z(78*4T/5) ... z(156*4T/5) | z(157*4T/5) ... z(235*4T/5) | z(236*4T/5) ... z(314*4T/5) |

Fig. 5 generation of 5 polyphase sequences:
p(j) = z(k*4T+j*4T/5) j = 0, 1, ... 4 p(0) | z(0) | z(5*4T/5) | z(10*4T/5) | ...... | z(310*4T/5) |
p(1) | z(0+4T/5) | z(5*4T/5+4T/5) | z(10*4T/5+4T/5) | ...... | z(310*4T/5+4T/5) |
p(2) | z(0+2*4T/5) | z(5*4T/5+2*4T/5) | z(10*4T/5+2*4T/5) | | z(310*4T/5+2*4T/5) |
p(3) | z(0+3*4T/5) | z(5*4T/5+3*4T/5) | z(10*4T/5+3*4T/5) | | z(310*4T/5+3*4T/5) |
p(4) | z(0+4*4T/5) | z(5*4T/5+4*4T/5) | z(10*4T/5+4*4T/5) | | z(310*4T/5+4*4T/5) |

Fig. 6

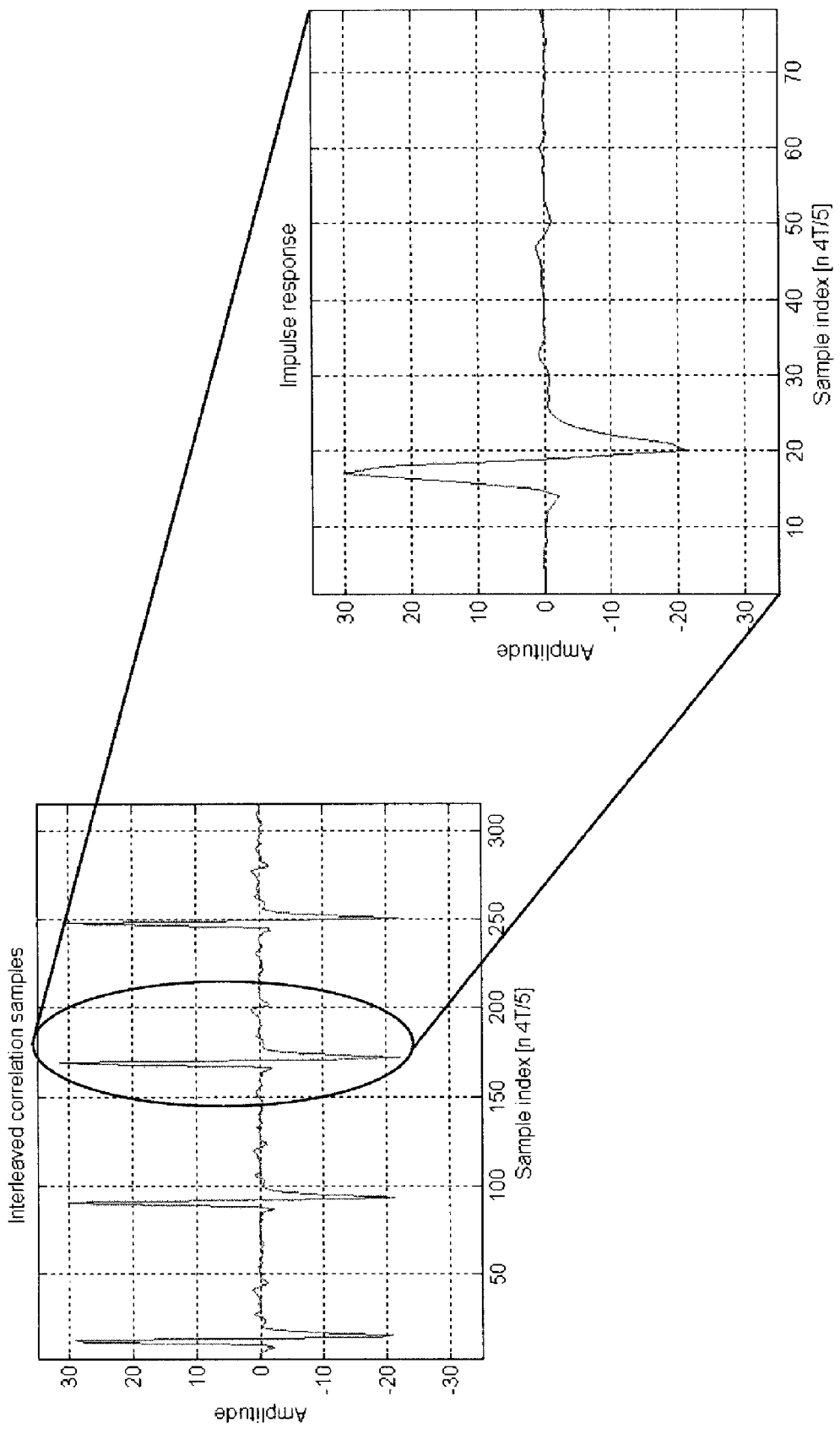
Fig. 9    32 - samples truncated impulse response:   h(0) h(4T/5) ... h(31*4T/5)

Compute cross correlation vector:

$V = [v(i)], i = 1, 2, ..., N$

Impulse response

| h(0) h(4T/5) ... h(31*4T/5) |

\*

PR4 target

| p(0) p(4T/5) ... p(25*4T/5) |

=

| v'(0) v'(4T/5) ... v'(56*4T/5) |

Cross correlation vector V: $v(1), v(2), ..., v(N)$

OVERSAMPLED CHANNEL RESPONSE IDENTIFICATION

FIELD OF THE INVENTION

This invention relates generally to identification of the impulse response of an oversampled data channel. Methods, apparatus and computer programs are provided for identifying the impulse response, and for determining additional parameters such as equalizer coefficients which are dependent on the response.

BACKGROUND OF THE INVENTION

The impulse response of a data channel such as a communications or magnetic recording channel is important for determining parameters of various media and signal processing components. In magnetic recording, where non-return to zero (NRZ) modulation format is usually adopted, the impulse response of the recording channel corresponds essentially to the pulse, or "dibit", response, i.e. the response of the channel to a pulse input. The step, or "transition", response of the recording channel, i.e. the response of the channel to a step input, can be derived from this dibit response. The dibit and transition responses of the magnetic recording channel in data storage devices such as hard-disk drives and tape drive systems are very important for the design of the detection circuitry as well as for characterization of media, head, and read-channel components generally. One of the most important applications of the response identification is the off-line computation of the equalizer coefficients. This procedure is normally performed during manufacture of the storage device. Known techniques involve the recording of a pseudo-random binary sequence (PRBS), and the capture and processing of the T-spaced sampled or oversampled readback waveform, where 1/T is the symbol rate of the input PRBS. After collection of an appropriate number of readback samples, computation of the equalizer coefficients is usually performed either by a dedicated hardware engine or by software executed in a microcontroller. An example of this is described in US Patent Application Publication No. US 2003/0028833 A1. The set of equalizer coefficients can then be used during normal operation of the storage device, either as they stand or as an initial set of coefficients that can be updated by an adaptive procedure during operation.

Another important application of the dibit and transition responses is the characterization of nonlinear write effects which cause significant degradation at high linear recording densities. Nonlinear distortion cannot, in general, be corrected by equalization. It is therefore particularly important that these effects are correctly identified and quantified. Known techniques for identifying these effects again involve the recording of PRBS sequences and identification of the dibit response. An example is described in "Identification of Nonlinear Write Effects using Pseudorandom Sequences", Palmer et al, IEEE Transactions on Magnetics, Vol. MAG-23, No. 5, September 1987.

In hard-disk drives, the recording data rate 1/T is very high, and usually the sampling interval of the readback signal is equal to the inverse of this data rate, i.e. T. As a consequence the use of PRBSs leads to a very simple multiplication-free correlation method for extracting the dibit response of the magnetic recording channel. Such schemes lend themselves to very simple hardware implementations. For oversampled waveforms, i.e. where the channel output signal is sampled at a higher rate than 1/T, such a simple approach is not feasible. For example, tape drives use oversampled waveforms with a typical value of 5/4 for the oversampling factor. In general, if the sampling interval for the channel output is permitted to take values $T_S=(q/p)T$, where p and q are relative prime integers with q<p, the oversampled channel response may be extracted by first identifying each of the p subchannels of the overall dibit channel response, and then overlaying the resulting subchannel responses, see "Least-squares Storage Channel Identification", J. M. Cioffi, IBM J. Res. Develop., Vol. 30, No. 3, May 1986. Unfortunately, this method requires multiplication of real numbers, rendering its implementation in hardware or software impractical.

While the foregoing has focussed primarily on magnetic recording systems, similar considerations apply in other systems, particularly data communications systems. It will therefore be apparent that a computationally efficient procedure for identifying the impulse response of a data channel would be highly desirable.

SUMMARY OF THE INVENTION

An embodiment of a first aspect of the present invention provides a method for identifying the impulse response of a data channel. The method comprises the following steps:

supplying to the channel an input comprising a pseudo-random binary sequence of L symbols at a symbol rate of 1/T;

producing a channel output by sampling a channel output signal corresponding to said input with a sampling interval $T_S=(q/p)T$, where q and p are relative prime integers with q<p, and q and L are relative prime integers;

producing p polyphase sequences from said channel output by selecting, for each polyphase sequence, every $p^{th}$ sample of said output, with a phase shift of one sample between successive polyphase sequences;

producing a decimated binary sequence by selecting every $q^{th}$ symbol of the channel input;

for each polyphase sequence, correlating that polyphase sequence with the decimated binary sequence, the two possible binary values being of equal magnitude and opposite sign for the correlation, and accumulating the correlation results to produce a correlated output sequence; and interleaving samples of the correlated output sequences in phase order of the corresponding polyphase sequences to produce the impulse response of the channel.

Thus, in embodiments of the invention, p polyphase sequences are produced from an oversampled channel output corresponding to the input PRBS. Each of these polyphase sequences is correlated with a PRBS produced by decimating the original input PRBS by q, with the two possible bit values being of equal and opposite magnitude, effectively ±1, for the correlation process. Correlation of two signals essentially involves multiplication of samples of one signal with respective corresponding samples of the other signal. In the process just described, the correlation process involves a change of sign. The multiplication of real numbers, and hence the need for true multipliers, is therefore avoided. Nevertheless, when the results of correlating the polyphase sequences with the decimated sequence are interleaved, the process yields the impulse response of the data channel. An elegantly simple and highly efficient process is therefore provided for multiplication-free identification of the oversampled channel impulse response. Embodiments of the invention offer efficient, high-speed implementations in both hardware and software, and can be employed to advantage in any of the various applications, both online and off-line, which rely on identification of the channel impulse response.

Clearly if the data channel is a magnetic recording channel then the input PRBS will be recorded in the recording channel. In this case the impulse response produced is the pulse, or dibit, response of the recording channel. In other embodiments the data channel may be a wired or wireless communications channel in which case the input PRBS is of course transmitted over the channel. In either case, the channel output from which the polyphase sequences are generated is preferably produced by averaging a plurality of sampled channel output signals corresponding to the input PRBS. This averaging process mitigates the effects of noise in the output signals. The recorded PRBS will thus be read a plurality of times in recording applications, and the input PRBS will be transmitted and received a plurality of times in communications applications.

While the channel input could conceivably consist of a sole instance of the PRBS, better results can be achieved by employing a channel input comprising a periodic sequence, each period of which comprises the L-symbol PRBS. For greatest efficiency, the channel input preferably comprises q periods of the PRBS.

An embodiment of a second aspect of the invention provides a method for identifying the step response of a magnetic recording channel. This method comprises identifying the pulse response of the recording channel by a method according to the first aspect of the invention, and processing the pulse response to produce the step response.

Embodiments of the invention may be employed for fast, accurate and efficient computation of various parameters of the channel output processing apparatus. Thus, an embodiment of a third aspect of the invention provides a method for determining one or more parameters of signal processing apparatus for processing output signals from a data channel, the method comprising identifying the response of the data channel by a method according to the first or second aspects of the invention, and processing the response to derive a value for each said parameter dependent on that response. A particularly useful application here is the computation of the equalizer coefficients using the channel impulse response.

An embodiment of a fourth aspect of the invention provides a computer program comprising a computer-usable medium having embodied therein program code for causing a computer to perform a method according to any of the foregoing aspects of the invention. It will be understood that the term "computer" is used here in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code of the computer program may comprise any expression, in any language, code or notation, of a set of instructions intended to cause a computer to perform the method in question, either directly or after either or both of (a) conversion to another language, code or notation, and (b) reproduction in a different material form.

An embodiment of the present invention also provides apparatus for implementing methods according to the foregoing aspects of the invention. In particular, an embodiment of a fifth aspect of the invention provides apparatus for identifying the pulse response of a magnetic recording channel in a data storage device in which data is recorded in the channel at a symbol rate of 1/T and sampled channel output signals are produced by sampling readback signals with a sampling interval $T_S=(q/p)T$, where p and q are relative prime integers and q<p. The apparatus comprises:

a controller for controlling recording of a channel input comprising a pseudo-random binary sequence of L symbols, and for producing a decimated binary sequence by selecting every $q^{th}$ symbol of the channel input where q and L are relative prime integers;

a sequence generator for producing p polyphase sequences from a channel output corresponding to said input, each polyphase sequence being produced by selecting every $p^{th}$ sample of said output, with a phase shift of one sample between successive polyphase sequences; and a correlator for correlating each polyphase sequence with said decimated binary sequence, the two possible binary values being of equal magnitude and opposite sign for the correlation, and accumulating the correlation results to produce a correlated output sequence for that polyphase sequence;

wherein the controller is adapted for interleaving samples of the correlated output sequences in phase order of the corresponding polyphase sequences to produce the pulse response of the recording channel.

An embodiment of a sixth aspect of the invention provides apparatus for identifying the impulse response of a data communications channel when a channel input, comprising a pseudo-random binary sequence of L symbols, is transmitted over the channel at a symbol rate of 1/T and the received signal is sampled with a sampling interval $T_S=(q/p)T$ to produce a sampled channel output signal, where q and p are relative prime integers with q<p, and q and L are relative prime integers. The apparatus comprises:

a sequence generator for producing p polyphase sequences from a channel output corresponding to said channel input, each polyphase sequence being produced by selecting every $p^{th}$ sample of said output, with a phase shift of one sample between successive polyphase sequences;

a controller for producing a decimated binary sequence comprising every $q^{th}$ symbol of said channel input; and a correlator for correlating each polyphase sequence with said decimated binary sequence, the two possible binary values being of equal magnitude and opposite sign for the correlation, and accumulating the correlation results to produce a correlated output sequence for that polyphase sequence;

wherein the controller is adapted for interleaving samples of the correlated output sequences in phase order of the corresponding polyphase sequences to produce the impulse response of the channel.

In embodiments of the foregoing apparatus, the controller may be adapted for processing the response to derive a value, dependent on that response, for at least one parameter of signal processing apparatus for processing channel output signals. For example, the controller may be adapted for processing the impulse response of the data channel to derive coefficients for an equalizer of the signal processing apparatus.

In general, where features are described herein with reference to an embodiment of one aspect of the invention, corresponding features may be provided in embodiments of another aspect of the invention.

DESCRIPTION OF THE DRAWINGS

Preferred embodiments of the invention will now be described, by way of example, with reference to the accompanying drawings in which:

FIG. 2 is a schematic representation of a channel input used by the FIG. 1 apparatus;

FIG. 3 illustrates a decimated binary sequence produced in operation of the embodiment;

FIG. 4 illustrates a channel output signal obtained in operation of the embodiment;

FIG. 5 illustrates an average channel output produced in operation of the embodiment;

FIG. 6 illustrates generation of polyphase sequences in operation of the embodiment;

FIG. 9 illustrates production of the channel impulse response by a controller of the apparatus.

DETAILED DESCRIPTION OF THE INVENTION

Figure 1:
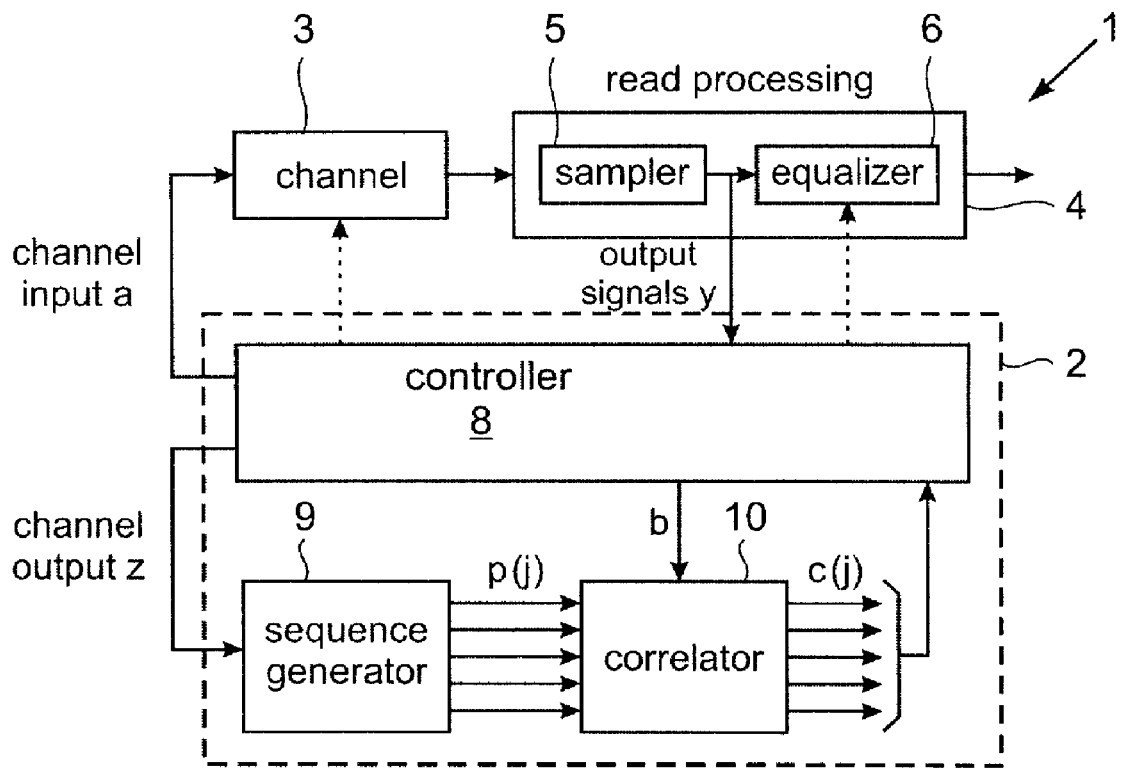
FIG. 1 is a schematic block diagram of apparatus embodying the invention for identifying the impulse response of a magnetic recording channel in a data storage system.

A data storage system incorporating an embodiment of impulse response identification apparatus is illustrated schematically in FIG. 1. In this example, the data storage system is a tape drive 1 and includes impulse response identification apparatus in the form of response analysis module 2 which implements a response identification method embodying the invention. The data channel here is thus a magnetic recording channel 3 comprising a read/write head for recording data on, and reading data from, a magnetic tape. In operation of tape drive 1, data is recorded in channel 3 with a recording data rate of 1/T. Readback signals output by the read/write head are supplied to read processing apparatus indicated generally at 4. Read processing apparatus 4 is shown in simplified form in the figure as including a sampler 5 and an equalizer 6 to which particular reference will be made in describing operation of response analysis module 2. Sampler 5 samples readback signals output by channel 3 with a sampling rate $T_S=(q/p)T$, where $q=4$ and $p=5$ in this example. As will be apparent to those skilled in the art, read processing circuitry typically includes various other components (not shown) for performing functions such as automatic gain control, low-pass filtering, sequence detection, decoding and error correction. Similarly, the write-processing apparatus on the recording side of channel 3 is omitted from the figure for simplicity, but typically includes components performing functions such as encoding, partial response preceding, write equalization and write-precompensation.

Impulse response analysis module 2 comprises a controller 8, a sequence generator 9 and a correlator 10 as indicated in the figure. As indicated by the broken lines in the figure, the controller 8 in this embodiment can control read/write operations of channel 3, and also aspects of the operation of equalizer 6. More specifically, controller 8 can effect a read/write operation the results of which can be processed in analysis module 2 to identify the impulse response, here the pulse, or dibit, response, of channel 3, and also to compute values for the coefficients of equalizer 6 appropriate to that response. Briefly, in operation of module 2, the controller 8 controls recording in channel 3 of an input sequence a and controls the read/write head to read the recorded sequence. Readback signals from the channel are oversampled by sampler 5 and the resulting sampled channel output signals y are received by controller 8 as indicated in the figure. Controller 8 averages these sampled output signals y to produce an average channel output sequence z. The channel output z is supplied to sequence generator 9 which generates five polyphase sequences p(j), (j=0, 1, . . . 4) from the sequence z. The polyphase sequences p(j) are output to correlator 10 which also receives an input sequence b from controller 8. Controller 8 generates the sequence b from the original channel input a by decimating the sequence a by q (q being 4 in this example). Correlator 10 correlates each polyphase sequence p(j) with the decimated input sequence b and accumulates the correlation results to produce a correlated output sequence c(j). The correlated output sequences are then supplied to controller 8 which interleaves these sequences to produce the impulse response of recording channel 3. This is further processed in controller 8 to derive appropriate coefficients for equalizer 6 which are then output to the equalizer for use in subsequent operation of the tape drive. The various steps of the foregoing process are explained in more detail below.

The channel input sequence a supplied by controller 8 to initiate the above process is illustrated schematically in FIG. 2. The sequence a consists of $q=4$ periods each consisting of a PRBS of length $L=63$ bits. Various PRBS patterns may be employed here and suitable examples will be apparent to those skilled in the art. The sequence a is thus recorded in channel 3 as $a=a(mT)$ where $m=0, 1, \ldots 251$, $1/T$ is the recording data rate, and where the bit values in this example are represented by +1 and −1.

The decimated binary sequence b is illustrated in FIG. 3. Controller 8 produces this sequence from the channel input a by selecting every $q^{th}$ symbol of sequence a. In this example therefore controller 8 selects every $4^{th}$ symbol of sequence a. This produces another 63-bit PRBS $b=a(k4T), k=0, 1, \ldots 62$, having the original PRBS symbol indices shown in the figure.

When the channel input a is readback and oversampled by sampler 5, a sampled channel output signal y is obtained as shown in FIG. 4. The output signal samples are spaced at $T_S=4T/5$, resulting in a 315-sample sequence over a $4*63T$ time interval. As mentioned earlier, to mitigate the effects of noise in the output signal, the input sequence a is periodically repeated, here M times, to produce M output signals y. Controller 8 then averages these signals to produce the channel output sequence z shown in FIG. 5. The value of M may be selected as required in a given system, but a typical value for M might be 10.

Figure 7:
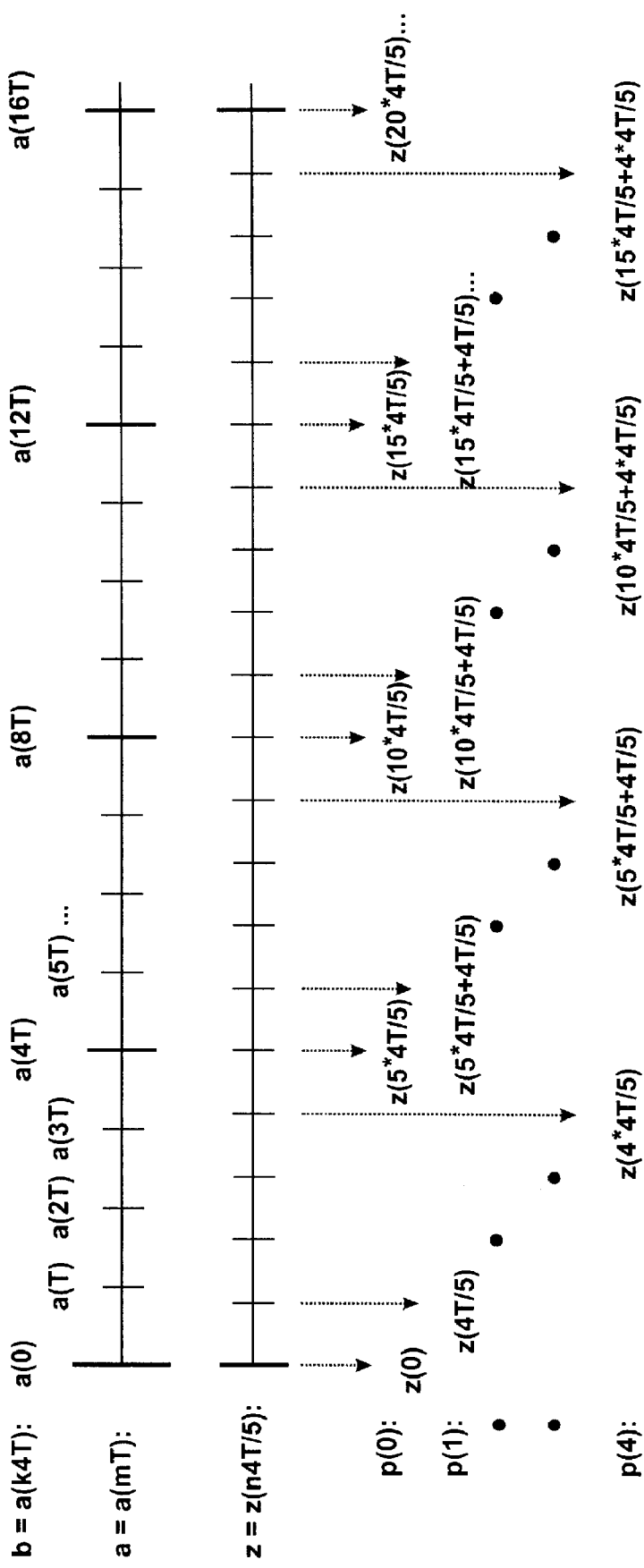
FIG. 7 illustrates the relative timing of various sequences in operation of the embodiment.

Controller 8 supplies the output signal z to sequence generator 9 which produces $p=5$ polyphase sequences $p(j)=z(k*4T+j*4T/5)$, where $j=0, 1, \ldots 4$, and $k=0, 1, \ldots 62$ as before. In effect, therefore, each polyphase sequence is produced by selecting every $5^{th}$ sample of the channel output z, with a phase shift of one sample between successive polyphase sequences. The resulting polyphase sample sequences p(0) to p(4) are illustrated in FIG. 6. FIG. 7 further illustrates the polyphase sample timings relative to the basic sequence z in comparison to the original input sequence a and the decimated sequence b. The input symbols shown in bold at the top represent the decimated sequence symbols b, and it can be seen that these are coincident in time with the samples of polyphase sequence p(0).

Figure 8:
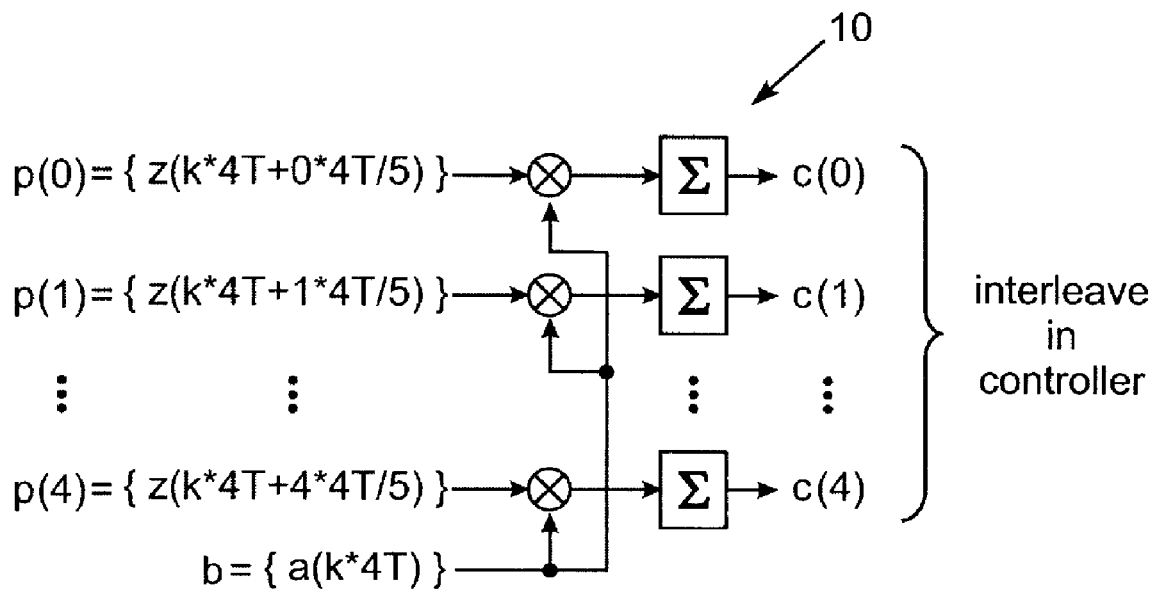
FIG. 8 is a schematic block diagram of a correlator of the FIG. 1 apparatus.

The polyphase sequences p(0) to p(4) are supplied by sequence generator 9 to correlator 10 which also receives the decimated sequence b from controller 8. The correlator 10 is shown in more detail in FIG. 8. As illustrated, the correlator operates to correlate each polyphase signal p(j) with the decimated sequence b, the results being accumulated on a sample-by-sample basis to produce a correlated output signal $c(j)=c_j(k*4T)$, where $k=0$ to 62 as before. It will be understood by those skilled in the art that the process of correlating two signals involves multiplication of each successive sample of one signal with the respective corresponding sample of the other signal, as indicated by the multipliers shown in the figure. However, because the input binary values are ±1 here, the multiplication process involves a change of sign. The multiplication of real numbers, and hence the need for true multipliers, is therefore avoided in the correlation process.

The correlated output signals c(0) to c(4) are supplied sample-by-sample to controller 8 which interleaves the signals in phase order of the corresponding polyphase sequences p(j). That is, the correlated signal samples are interleaved in the order: $c_0(0)$, $c_1(0)$, $c_2(0)$, $c_3(0)$, $c_4(0)$, $c_0(4T)$, $c_1(4T)$, $c_2(4T)$, $c_3(4T)$, $c_4(4T)$, $c_0(8T)$, $c_1(8T)$, ... and so on. As a result of this interleave process, the controller 8 obtains the impulse response, here the dibit response, of the recording channel 3. This is illustrated in FIG. 9, the left-hand side of which shows an example of the interleaved signal produced by controller 8. The enlarged section on the right-hand side shows the 32-sample truncated dibit response.

Figure 10:
FIGS. 10 and 11 describe processing of the impulse response by the controller to generate equalizer coefficients for the FIG. 1 system.
Figure 11:
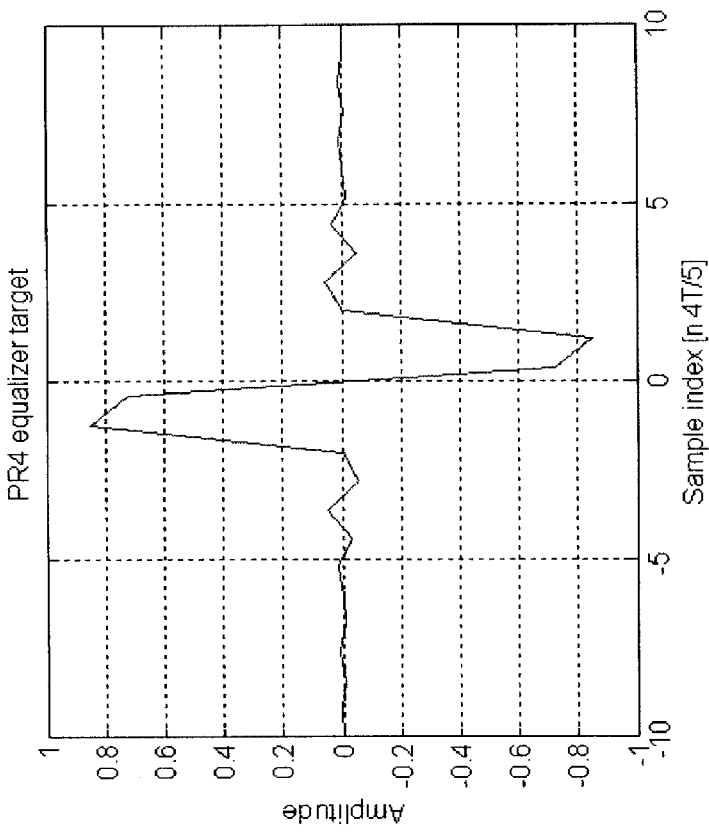

The impulse response obtained by the above process may be used for various purposes discussed further below, but in this particular example controller 8 processes the response to derive appropriate values for the fractionally-spaced coefficients of equalizer 6. This can be done in generally known manner, and implementations of the coefficient computation process will be apparent to those skilled in the art. Briefly, however, the correlation matrix R is calculated from the 32-sample impulse response using the Toeplitz structure as indicated in FIG. 10. The cross-correlation vector V is also calculated from the impulse response and the PR4 (partial response 4) equalizer target as indicated in FIG. 11. The equalizer coefficients are then given by $C=R^{-1}*V$, where $R^{-1}$ is the inverse (or pseudo-inverse) of R. This solution corresponds to the PR4 Zero-Forcing (ZF) structure. Alternatively, MMSE (minimum mean-square error) equalizer coefficients can be obtained by taking into account the statistics of the channel noise:

$C=(R+\sigma^2 I)^{-1}*V$ for electronics or thermal noise $C=(R+R_{ns})^{-1}*V$ for colored stationary noise where I is the identity matrix; $R_{ns}$ is the correlation matrix of the colored noise; and $\sigma^2$ is a small positive constant that is added across the diagonal of the channel correlation matrix. This is done because it is often impractical to compute the correlation properties of the additive noise, and improves the out-of-band noise rejection properties as well as reducing noise enhancement. In any case, the resulting coefficients derived by controller 8 are supplied to equalizer 6 for use in subsequent operation of the storage device.

It will be seen from the foregoing that the response analysis module 2 operates to identify the oversampled channel impulse response by a highly efficient process involving a simple, multiplication-free correlation method. This offers simple, high-speed operation which can be readily implemented in both hardware and software. In particular, it will be appreciated that the functional blocks 8, 9 and 10 of module 2 may be implemented in hardware, software or a combination thereof as desired in a given system. For example, the functionality of module 2 may be included as part of the C-code currently used for initial equalizer computation. In general, module 2 allows fast and accurate computation of the equalizer coefficients, and may be employed during manufacture of the tape drive 1 and/or may be a "built-in" module whose operation can be invoked when required. For example, if the drive is damaged a "retraining" mode may be invoked whereby the module 2 operates to recalculate the equalizer coefficients. The retraining mode may also be invoked to deal with changes in the impulse response due to aging of the tape.

Depending on the particular application and operating mode of the response analysis apparatus 2, various other operations may be performed by controller 8. For example, the impulse response may be further processed to determine appropriate values for various other parameters of the processing apparatus 6, e.g. parameters of the detection circuitry. In addition, the impulse response may be utilized in further processing for the identification and measurement of non-linearities and bit-shift during a special off-line procedure of the tape drive. The identified response may also be utilized in noise component characterization and separation functions, whether additive stationary noise, additive colored noise or media noise such as transition noise and data-dependent noise. The dibit response obtained in the embodiment described may be further processed in controller 8 to identify the step, transition, response of the channel. This can be achieved in known manner and implementations of this processing will be apparent to those skilled in the art. The dibit response h(t) and the transition response g(t) are related by h(t)=g(t)−g(t−T). The transition response is generally approximated using a Lorentzian model, and minimum mean-square error methods are usually adopted to obtain the parameters of the Lorentzian model from the dibit response. The step response may then be utilized in various additional processing operations as described above. In general, the highly efficient nature of the response extraction process described above offers considerably faster computation of channel parameters compared to existing on-line or off-line methods.

Various other changes and modifications can be made to the preferred embodiment described above without departing from the scope of the invention. For example, while the module 2 of FIG. 1 utilizes the read-channel sampler 5 in this embodiment, in some applications the response analysis apparatus may include its own sampler allowing readback signals to be received directly from the channel. Also, the controller 8 may be embodied in a more general controller which controls various aspects of the device operation. While the above embodiment is employed in a tape drive, embodiments of the invention may be employed to identify the impulse response of other oversampled data channels, e.g. in other data storage systems such as disk drives, or in data communications systems. In the latter case operation is generally as described above for recording channel 3, except the controller 8 would of course receive output signals from a receiver mechanism connected to the communications channel. Multiple channel output signals for the averaging process of FIG. 5 would also be obtained by multiple transmissions of the channel input. Such transmission could be prompted under control of controller 8, or the controller might be adapted to perform the functions described in response to transmission of a predetermined channel input. Various other values for the parameters L, p and q may of course be employed in other systems as will be apparent to those skilled in the art.

We claim:

1. A method for identifying the impulse response of a data channel, the method comprising:

using an apparatus comprising a controller, a sequence generator, and a correlator for:

supplying to the data channel an input comprising a pseudo-random binary sequence of L symbols at a symbol rate of 1/T;

producing a channel output by sampling a channel output signal corresponding to said input with a sampling interval $T_S=(q/p)T$, where q and p are relative prime integers with q<p, and q and L are relative prime integers;

producing p polyphase sequences from said channel output by selecting, for each polyphase sequence, every $p^{th}$ sample of said output, with a phase shift of one sample between successive polyphase sequences;

producing a decimated binary sequence by selecting every $q^{th}$ symbol of the channel input;

for each polyphase sequence, correlating that polyphase sequence with the decimated binary sequence, the two possible binary values being of equal magnitude and opposite sign for the correlation, and accumulating the correlation results to produce a correlated output sequence; and interleaving samples of the correlated output sequences in phase order of the corresponding polyphase sequences to produce the impulse response of the channel.

2. A method according to claim 1 wherein said channel output is produced by sampling a plurality of channel output signals corresponding to said input with the sampling interval $T_S$, and then averaging the sampled output signals.

3. A method according to claim 1 wherein the channel input comprises a periodic sequence each period of which comprises the L-symbol pseudo-random binary sequence.

4. A method according to claim 3 wherein the channel input comprises q periods of the pseudo-random binary sequence.

5. A method according to claim 1 wherein L=63, q=4 and p=5.

6. A method according to claim 1 wherein the data channel is a magnetic recording channel, whereby the channel input is recorded in the recording channel and the impulse response produced is the pulse response of the recording channel.

7. A method for identifying the step response of a magnetic recording channel, the method comprising:
   using an apparatus comprising a controller, a sequence generator, and a correlator for:
   identifying the pulse response of the recording channel by a method according to claim 6, and
   processing the pulse response to produce the step response.

8. A method according to claim 1 wherein the data channel is a communications channel.

9. A method for determining one or more parameters of signal processing apparatus for processing output signals from a data channel, the method comprising:
   using an apparatus comprising a controller, a sequence generator, and a correlator for:
   identifying the response of the data channel by: supplying to the channel an input comprising a pseudo-random binary sequence of L symbols at a symbol rate of 1/T;
   producing a channel output by sampling a channel output signal corresponding to said input with a sampling interval $T_S=(q/p)T$, where q and p are relative prime integers with q<p, and q and L are relative prime integers; producing p polyphase sequences from said channel output by selecting, for each polyphase sequence, every p.sup.th sample of said output, with a phase shift of one sample between successive polyphase sequences;
   producing a decimated binary sequence by selecting every q.sup.th symbol of the channel input;
   for each polyphase sequence, correlating that polyphase sequence with the decimated binary sequence, the two possible binary values being of equal magnitude and opposite sign for the correlation, and accumulating the correlation results to produce a correlated output sequence, and interleaving samples of the correlated output sequences in phase order of the corresponding polyphase sequences to produce the impulse response of the channel, and
   processing the response of the data channel to derive a value for each said parameter dependent on that response.

10. A method according to claim 9 further comprising:
    determining coefficients for an equalizer of the signal processing apparatus, said determining comprising processing the impulse response of the data channel to derive coefficients for the equalizer which are appropriate for that impulse response.

11. A computer-usable medium having embodied therein computer-readable program code for causing a computer to perform a method for identifying the impulse response of a data channel, the method comprising:
    supplying to the channel an input comprising a pseudo-random binary sequence of L symbols at a symbol rate of 1/T;
    producing a channel output by sampling a channel output signal corresponding to said input with a sampling interval $T_S=(q/p)T$, where q and p are relative prime integers with q<p, and q and L are relative prime integers;
    producing p polyphase sequences from said channel output by selecting, for each polyphase sequence, every $p^{th}$ sample of said output, with a phase shift of one sample between successive polyphase sequences;
    producing a decimated binary sequence by selecting every $q^{th}$ symbol of the channel input;
    for each polyphase sequence, correlating that polyphase sequence with the decimated binary sequence, the two possible binary values being of equal magnitude and opposite sign for the correlation, and accumulating the correlation results to produce a correlated output sequence; and
    interleaving samples of the correlated output sequences in phase order of the corresponding polyphase sequences to produce the impulse response of the channel.

12. An apparatus for identifying a pulse response of a magnetic recording channel in a data storage device in which data is recorded in the channel at a symbol rate of 1/T and sampled channel output signals are produced by sampling readback signals with a sampling interval $T_S=(q/p)T$, where p and q are relative prime integers and q<p, the apparatus comprising:
    a controller for controlling recording of a channel input comprising a pseudo-random binary sequence of L symbols, and for producing a decimated binary sequence by selecting every $q^{th}$ symbol of the channel input where q and L are relative prime integers;
    a sequence generator for producing p polyphase sequences from a channel output corresponding to said input, each polyphase sequence being produced by selecting every $p^{th}$ sample of said output, with a phase shift of one sample between successive polyphase sequences; and
    a correlator for correlating each polyphase sequence with said decimated binary sequence, the two possible binary values being of equal magnitude and opposite sign for the correlation, and accumulating the correlation results to produce a correlated output sequence for that polyphase sequence;
    wherein the controller is adapted for interleaving samples of the correlated output sequences in phase order of the corresponding polyphase sequences to produce the pulse response of the recording channel.

13. The apparatus according to claim 12 wherein the controller is further adapted for processing the pulse response to produce the step response of the recording channel.

14. The apparatus according to claim 12 wherein the controller is adapted for controlling reading of the recorded channel input a plurality of times to produce a corresponding plurality of sampled channel output signals, for averaging the sampled channel output signals to produce said channel output, and for supplying the channel output to the sequence generator.

15. The apparatus according to claim 12 wherein said channel input comprises q periods of the pseudo-random binary sequence.

16. The apparatus according to claim 12 wherein said controller is further adapted for processing said response to derive a value, dependent on that response, for at least one parameter of signal processing apparatus for processing output signals from the data channel.

17. The apparatus according to claim 16 wherein the controller is further adapted for processing the impulse response of the data channel to derive coefficients for an equalizer of the signal processing apparatus which are appropriate for that impulse response.

18. An apparatus for identifying the impulse response of a data communications channel when a channel input, comprising a pseudo-random binary sequence of L symbols, is transmitted over the channel at a symbol rate of 1/T and the received signal is sampled with a sampling interval $T_S=(q/p)T$ to produce a sampled channel output signal, where q and p are relative prime integers with q<p, and q and L are relative prime integers, the apparatus comprising:

a sequence generator for producing p polyphase sequences from a channel output corresponding to said channel input, each polyphase sequence being produced by selecting every $p^{th}$ sample of said output, with a phase shift of one sample between successive polyphase sequences;

a controller for producing a decimated binary sequence comprising every q.sup.th symbol of said channel input; and a correlator for correlating each polyphase sequence with said decimated binary sequence, the two possible binary values being of equal magnitude and opposite sign for the correlation, and accumulating the correlation results to produce a correlated output sequence for that polyphase sequence;

wherein the controller is adapted for interleaving samples of the correlated output sequences in phase order of the corresponding polyphase sequences to produce the impulse response of the channel.

19. The apparatus according to claim 18 wherein said channel input is transmitted over the channel a plurality of times to produce a corresponding plurality of sampled channel output signals, and wherein the controller is adapted for averaging the sampled channel output signals to produce said channel output and for supplying the channel output to the sequence generator.

20. The apparatus according to claim 18 wherein said channel input comprises q periods of the pseudo-random binary sequence.

21. The apparatus according to claim 18 wherein said controller is further adapted for processing said response to derive a value, dependent on that response, for at least one parameter of signal processing apparatus for processing output signals from the data channel.

22. The apparatus according to claim 21 wherein the controller is further adapted for processing the impulse response of the data channel to derive coefficients for an equalizer of the signal processing apparatus which are appropriate for that impulse response.

* * * * *